May 13, 1924. 1,493,939
E. E. MILLER
EXPANSIBLE PACKING
Filed April 18, 1922
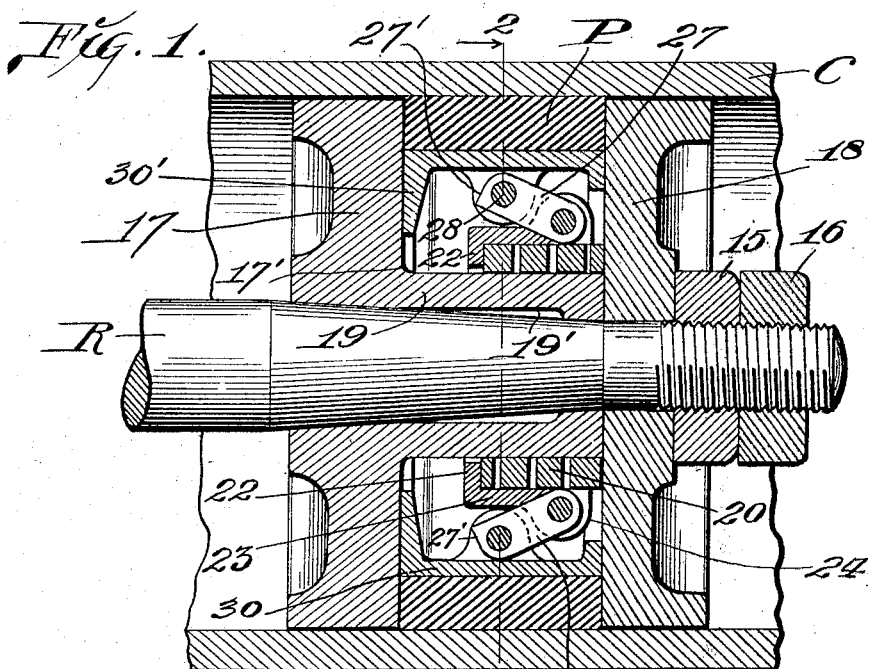
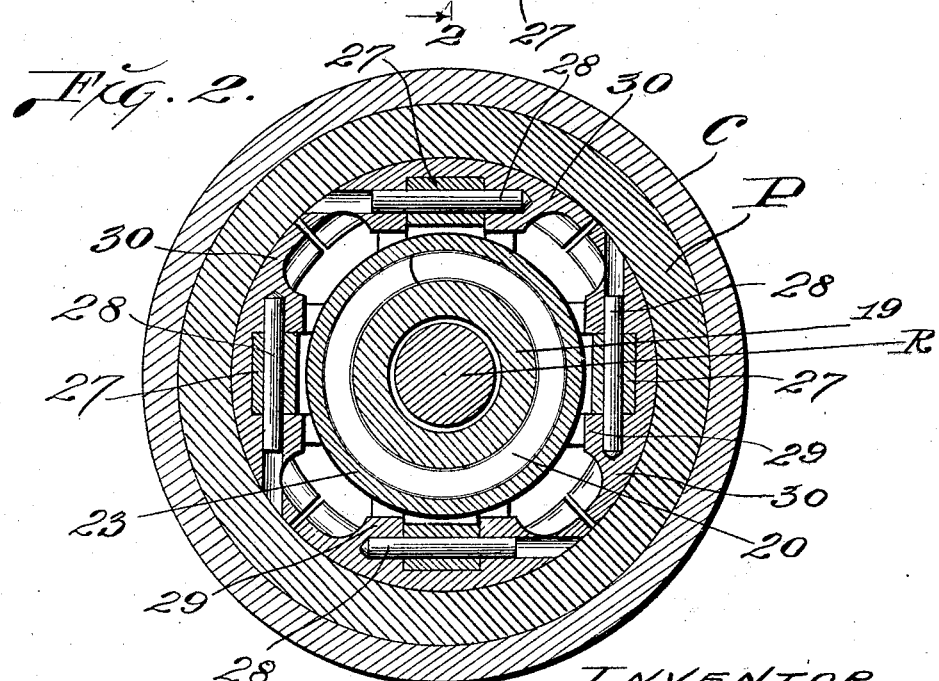
INVENTOR,
Erwin E. Miller.
By Hazard & Miller
Attys.

Patented May 13, 1924.

1,493,939

UNITED STATES PATENT OFFICE.

ERWIN E. MILLER, OF FULLERTON, CALIFORNIA.

EXPANSIBLE PACKING.

Application filed April 18, 1922. Serial No. 554,852.

*To all whom it may concern:*

Be it known that I, ERWIN E. MILLER, a citizen of the United States, residing at Fullerton, in the county of Orange and State of California, have invented new and useful Improvements in Expansible Packings, of which the following is a specification.

This invention relates to packing means for pistons of heavy duty pumps and relates especially to improvements in that type of packing means disclosed in my application filed November 9, 1921, Serial No. 514,115, for expansible packings.

In that application there is disclosed a combination of elements including spaced heads on a piston rod and between which heads there is disposed a packing ring adapted to be constantly thrust outwardly against the pump casing and the pressure means consists of a segmental rim or drum, to the segments of which are connected radially disposed links which are attached to a collar. The collar is normally firmly pressed in one direction by a stout spring to effect the outward movement of the rim members and thus maintain a tight running joint of the packing.

My present improvements consist of refinements having for their object the strengthening of the construction so as to withstand the high pressures encountered; to secure a reliable guiding combination for the segmental drum, and the invention has other objects as will be made apparent hereinafter.

An embodiment of the invention is described in the following specification and illustrated in the accompanying drawings, in which—

Fig. 1 is an axial section of the piston showing a portion of the pump tubing or casing.

Fig. 2 is a transverse section on line 2—2 of Fig. 1.

The organization consists of a piston rod R having a tapered end which terminates in a threaded portion to receive lock nuts 15 and 16. On the larger end of the tapered part of the rod there is positioned a piston head 17 provided with a laterally extending hub portion 19, the interior of which is bored at the ends to snugly fit on the tapered part of the rod R, and the intermediate portion of the bore is under cut or underreamed as at 19' so as to clear the intermediate tapered part of the rod. This construction is found desirable as it insures a snug fit of the hub 19 at each end of its bore, as is not always accomplished if the bore is tapered from end to end because of the obvious mechanical imperfectness of the bore and the taper. In the present construction the hub 19 is provided with a strong fillet 17' merging into the inner face of the head 17.

Jammed against the end of the hub 19 is a removable disc or head 18 which slides freely over the threaded end of the piston rod R. The heads 17—18 preferably clear the interior surface of the pump casing C and to make a tight joint, there is interposed between the heads 17—18 an extensible packing medium P which may be formed of rubber or other suitable material.

It is desirable to provide simple, practical and efficient means for constantly pressing the packing P outwardly against the casing surface, and this is accomplished by means of a segmental rim or drum which consists of a plurality of substantially duplicate sections 30 having, when contracted, a cylindrical exterior surface bearing against the interior of the packing.

Mounted upon the hub 19 for free sliding movement thereon is a collar or inwardly flanged annulus 23 and within this there is received a stout spring 20, one end of which is supported by the head 18, while the opposite end reacts against the flange 22 of the collar 23 so that the latter is firmly pressed away from the head 18 and toward the head 17. Interposed between the sections 30 of the expansible drum and the collar 23 is a set of thrust links 27, each of which is pivoted at its inner end to respective lugs 24 provided therefor about the collar 23, while at the outer ends the links 27 are pivotally connected to pins 28 received in bearing lugs 29 provided upon the interior surfaces of the various sections 30 of the expansible drum.

The parts are assembled in the condition shown in Fig. 1, at which time the segmental drum sections 30 are contracted to their innermost position when they are surrounded by a substantially new packing ring P, and at this time the several links 27 are rocked inwardly on their pivots in the ears 24 and the collar 23 is held in position adjacent to the piston head 18. As wear occurs between the packing ring P and the casing C, the pressure of the strong spring 20 acting through the links 27 forces the segmental sections 30 outwardly and this in turn reacts upon and expands the packing P, thus keeping a tight fit.

To provide for a substantial guide as between the packing members 30 and the piston members 17—18, one end of each of the sections 30 is provided with an inwardly turned flange 30' of considerable depth and which has a plane face to bear against the contiguous plane face, as for instance, of the head 17. This prevents the sections from binding or jamming and also provides an ample bearing surface to take the thrust of the spring 20 acting through the links 27. In other words, the inturned flanges 30' serve as bearing shoes providing a large sliding area of contact.

In order to prevent the spring 20 from throwing the inner ends of the links 27 past the dead center when the links are in their radial position and thus resulting in a contraction of the segments, the outer ends of the links 27 are provided with stop means to prevent such a passing of the dead center. Such stop means may consist in a tangential shoulder 27' on each link and which is designed to spring into abutment against the contiguous surface of its segment before the inner pivots of the links reach the dead center or radial position with respect to the outer pivots.

Various modifications and changes may be resorted to within the spirit of the invention as claimed.

What is claimed is:

1. In a pump piston of the expansible packing ring type and having spaced heads, means disposed between the heads for constantly expanding a piston ring and including a collar shiftable axially of the piston, an expansible segmental drum, a set of thrust links each pivotally connected at one end to one of the sections of the drum, and means for preventing the passing of the links through a radial dead center line.

2. In a pump piston of the expansible packing ring type and having spaced heads, means disposed between the heads for constantly expanding a piston ring and including a collar shiftable axially of the piston, an expansible segmental drum, a set of thrust links each pivotally connected at one end to one of the sections of the drum, means for preventing the passing of the links through a radial dead center line, and means constantly pressing against the collar and tending to move the links to a section expanding position.

3. In a pump piston of the expansible packing ring type and having spaced heads, means disposed between the heads for constantly expanding a piston ring and including a collar shiftable axially of the piston, an expansible segmental drum, a set of thrust links each pivotally connected at one end to one of the sections of the drum, said links having stop shoulders for preventing the passing of the links through a radial dead center line.

In testimony whereof I have signed my name to this specification.

ERWIN E. MILLER.